(12) United States Patent
Sugawara et al.

(10) Patent No.: US 7,831,359 B2
(45) Date of Patent: Nov. 9, 2010

(54) PASSENGER DETECTING DEVICE ADAPTED FOR MOTOR VEHICLE

(75) Inventors: Hiroyuki Sugawara, Nakano-ku (JP);
Takahiro Kawakami, Nakano-ku (JP);
Masatoshi Kobayashi, Nakano-ku (JP);
Hitoshi Matsuo, Nakano-ku (JP);
Noriyuki Okawa, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 791 days.

(21) Appl. No.: 11/822,642

(22) Filed: Jul. 9, 2007

(65) Prior Publication Data

US 2008/0012276 A1 Jan. 17, 2008

(30) Foreign Application Priority Data

Jul. 13, 2006 (JP) ............................. 2006-193080

(51) Int. Cl.
*G01G 9/00* (2006.01)
*B60R 21/16* (2006.01)

(52) U.S. Cl. .......................... 701/45; 280/735; 180/273

(58) Field of Classification Search ............. 701/45–47; 280/728.1, 730.1, 734–735; 180/271, 273
See application file for complete search history.

(56) References Cited

U.S. PATENT DOCUMENTS

| | | | |
|---|---|---|---|
| 5,739,757 A | * | 4/1998 | Gioutsos ..................... 340/667 |
| 5,810,392 A | * | 9/1998 | Gagnon ....................... 280/735 |
| 5,877,677 A | * | 3/1999 | Fleming et al. ............. 340/436 |
| 5,987,370 A | * | 11/1999 | Murphy et al. ................. 701/45 |
| 6,089,106 A | * | 7/2000 | Patel et al. ............. 73/862.582 |
| 6,101,436 A | * | 8/2000 | Fortune et al. ................. 701/45 |
| 6,138,067 A | * | 10/2000 | Cobb et al. .................... 701/45 |
| 6,161,070 A | * | 12/2000 | Jinno et al. ................... 701/45 |
| 6,246,936 B1 | * | 6/2001 | Murphy et al. ................ 701/45 |
| 6,438,477 B1 | * | 8/2002 | Patterson et al. .............. 701/45 |

FOREIGN PATENT DOCUMENTS

JP         2000-302003        10/2000

* cited by examiner

*Primary Examiner*—Yonel Beaulieu
(74) *Attorney, Agent, or Firm*—Wenderoth, Lind & Ponack, L.L.P.

(57) ABSTRACT

A passenger detecting device includes a plurality of weight sensors, a passenger judging and data updating device and an update forbidding device. The weight sensors are arranged at different positions of a seat for respectively detecting weights acting on the seat of a motor vehicle. The passenger judging and data updating device is capable of judging a passenger on the seat based on the loads detected by the weight sensors and updating information on the passenger. The update forbidding device prevents the passenger judging and data updating device from judging the passenger or prevents the information to be updated when a sum-weight fluctuation amount is not less than a first predetermined threshold value, where the sum-weight fluctuation amount is obtained by summing up weight function amounts which are absolute values of fluctuations of the loads detected by the weight sensors.

12 Claims, 8 Drawing Sheets

PASSENGER DETECTING DEVICE ADAPTED FOR MOTOR VEHICLE

BACKGROUND OF THE INVENTION

1. Field of the Invention

The present invention relates to a passenger detecting device that is adapted for a motor vehicle and is capable of surely detecting information on a passenger on a seat thereof.

2. Description of the Related Art

A conventional passenger detecting device, adapted for motor vehicle, of this kind is disclosed in Japanese patent laid-open publication No. 2000-302003. This conventional passenger detecting device has a seat belt sensor for detecting whether a seat belt of a passenger on a seat is fastened or not, and a seat sensor for detecting existence and weight of the passenger on the seat. When the seat belt sensor detects that the seat belt is fastened and the seat sensor detects existence of the passenger on the seat, the weight of the passenger is measured based on an output of the seat sensor. This detected weight data is stored and maintained to judge the passenger to be an adult, a small adult, or a child so that actuation of an air bag can be controlled, based on its judgment result, according to a physical size of the passenger, while the weight data is erased when the seat belt sensor detects unfastening of the seat belts.

The above known conventional passenger detecting device, however, encounters a problem in that information on the passenger on the seat can not be stably and properly obtained in some cases. For example, a child having heavy luggage may get in a motor vehicle and sit on the seat. In this case, when the child fastens the seat belt with the luggage, the seat sensor measures the weights of the child and his or her luggage, so that the passenger on the seat is judged to be an adult and information on the passenger, in which the passenger is an adult, is stored. After this judgment, the child is not judged to be a child any longer by the conventional passenger detecting device even when the child moves the luggage to another seat or another place. In another case, the detecting device may not properly detect the weight of the passenger when the passenger fastens the seat belt while the motor vehicle runs, especially when it suddenly accelerates and is suddenly braked.

It is, therefore, an object of the present invention to provide a passenger detecting device, adapted for motor vehicle, which can overcome the foregoing drawbacks and can more stably and properly detect information on a passenger on a seat than the conventional passenger detecting devices.

SUMMARY OF THE INVENTION

According to a first aspect of the present invention there is provided a passenger detecting device that is adapted for motor vehicle and includes a plurality of weight sensors, a passenger judging and data updating means, and an update forbidding means. The weight sensors are arranged at different positions of a seat for respectively detecting loads acting on the seat. The passenger judging and data updating means is capable of judging a passenger on the seat based on the loads detected by the weight sensors and updating information on the passenger. The update forbidding means prevents the passenger judging and data updating means from judging the passenger when a sum-weight fluctuation amount is not less than a first predetermined threshold value, where the sum-weight fluctuation amount is obtained by summing up weight function amounts which are absolute values of fluctuations of the loads detected by the weight sensors.

The passenger detecting device of the present invention can avoid caring-out of the judgment of passenger when the motor vehicle is in a fluctuation state, and accordingly the detecting device can more stably and properly detect information on a passenger on a seat than the conventional passenger detecting devices.

According to a second aspect of the present invention there is provided a passenger detecting device that is adapted for motor vehicle and includes a plurality of weight sensors, a passenger judging and data updating means, and an update forbidding means. The weight sensors are arranged at different positions of a seat for respectively detecting loads acting on the seat. The passenger judging and data updating means is capable of judging a passenger on the seat based on the loads detected by the weight sensors and updating information on the passenger. The update forbidding means prevents the information from being updated when a sum-weight fluctuation amount is not less than a first predetermined threshold value, where the sum-weight fluctuation amount is obtained by summing up weight function amounts which are absolute values of fluctuations of the loads detected by the weight sensors.

The passenger detecting device of the present invention can avoid caring-out of the update of the information on passenger when the motor vehicle is in the fluctuation state, and accordingly the detecting device can more stably and properly detect information on a passenger on a seat than the conventional passenger detecting devices.

Preferably, the passenger detecting further includes a sensor-malfunction means judges sensor malfunction by comparing the weight fluctuation amounts to a second predetermined threshold value when the sum-weight fluctuation amount is not less than the first predetermined threshold value.

Therefore, sensor malfunction can be detected even when outputs of the weight sensors are out of regular voltage and when it is in the regular voltage. This improves reliability of the judgment of a passenger.

Preferably, the weight sensors are located at a front left position, a front right position, a rear left position and a rear right position of the seat, respectively.

Therefore, the weight sensors can be properly detect the weight of the passenger on the seat, and the passenger can be judged easily and at low manufacturing costs, by using the four weight sensors for detecting the weights acting on the seat at its front left position, its front right position, its rear left position and its rear right position.

Preferably, the weight sensors are located on legs of the seat.

Therefore, the weight sensors can be easily fixed to the seat and properly detect the weight of the passenger.

Preferably, the passenger detecting device further includes an air bag that is capable of deploying to have different volumes according to the information of the passenger judging and data updating means.

Therefore, the air bag can be deployed properly according to the judgment result of the passenger.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
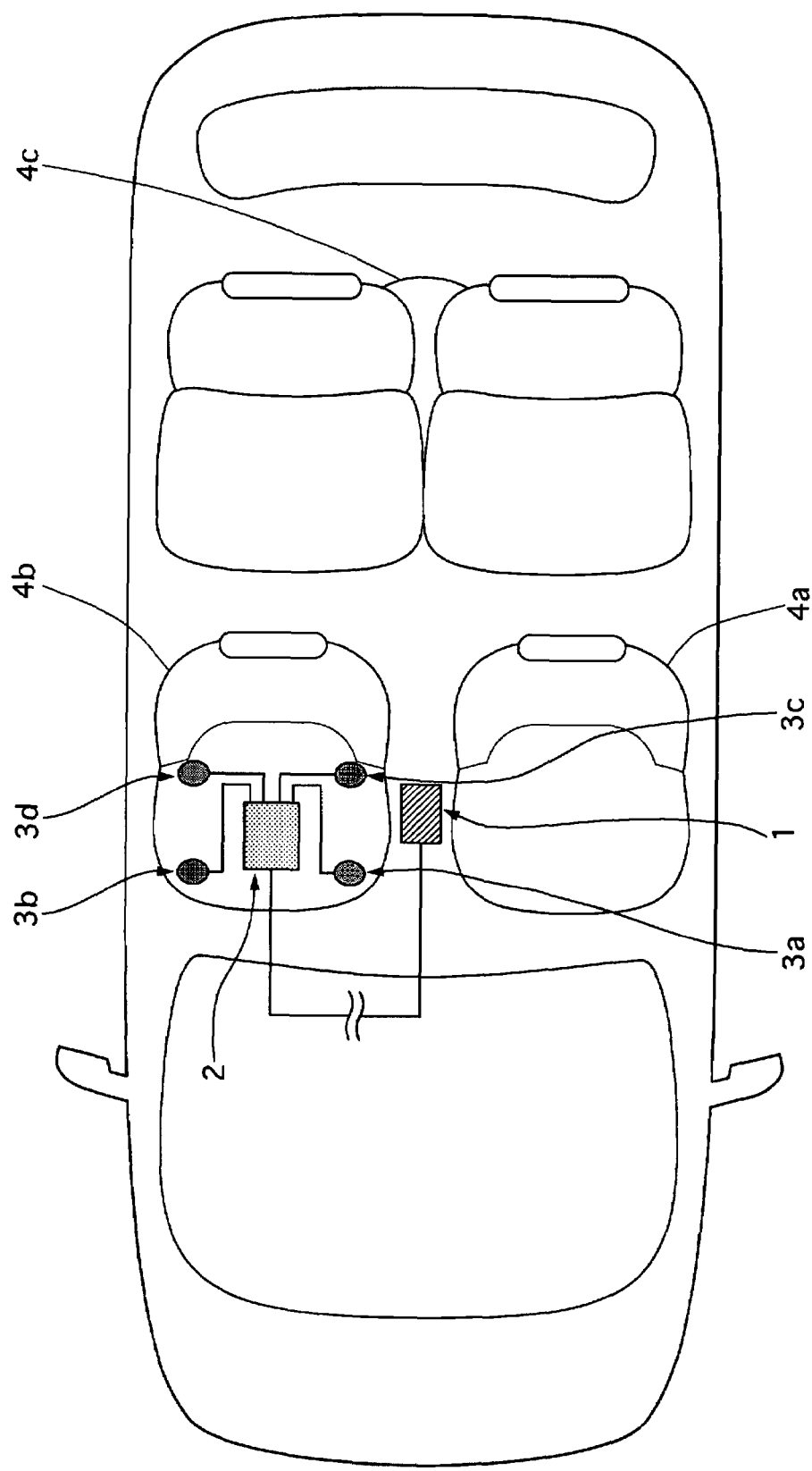
FIG. 1 is a schematic plan view showing a motor vehicle which is equipped with front seats, rear seats and a passenger detecting device, of a first embodiment according to the present invention, for detecting information on a passenger on the seat.

Throughout the following detailed description, similar reference characters and numbers refer to similar elements in all figures of the drawings, and their descriptions are omitted for eliminating duplication.

Figure 2:
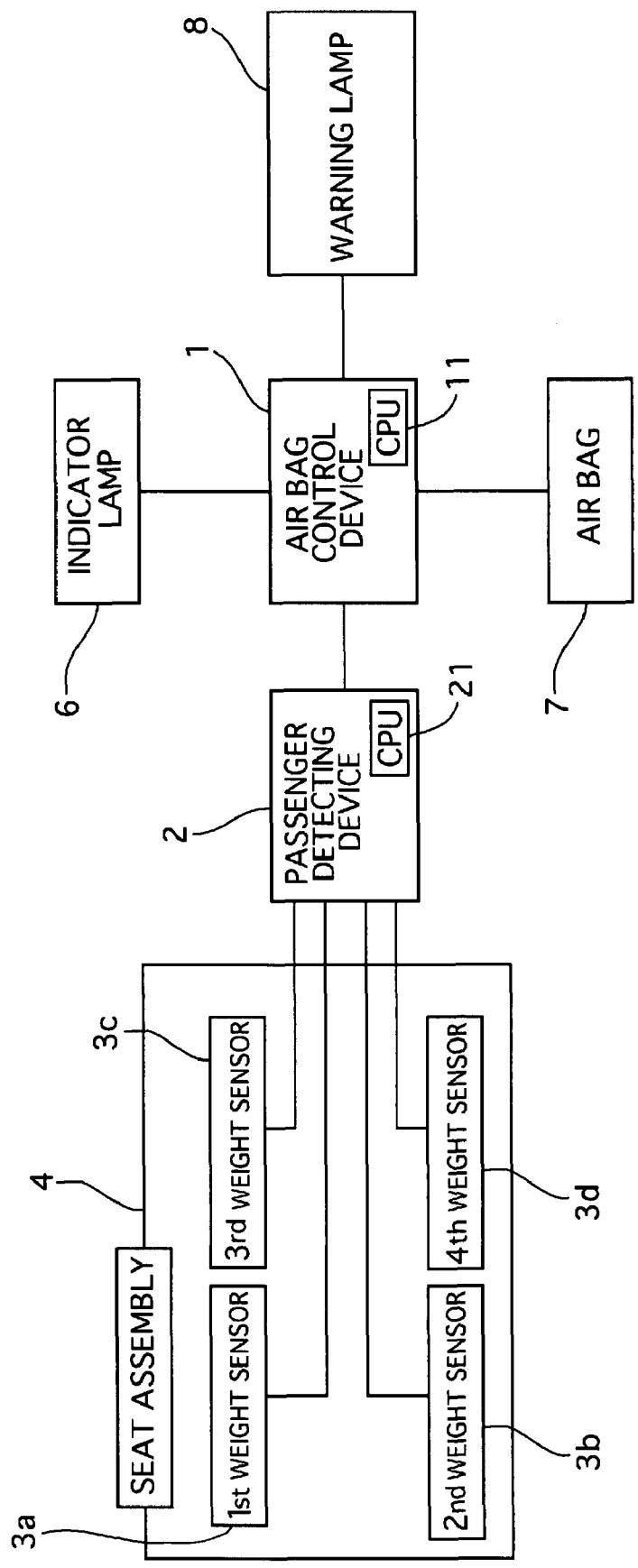
FIG. 2 is a block diagram of the passenger detecting device of the first embodiment and its related devices.

Referring to FIGS. 1 and 2 of the drawings, there is shown a passenger detecting device 2, adapted for an air-bag system of a motor vehicle, of a first preferred embodiment according to the present invention. The motor vehicle has a driver seat 4a, a front passenger seat 4b, and a rear passenger seat 4c. The motor vehicle is equipped with an air-bag control unit 1, the passenger detecting device 2, a passenger-detection-state indicator lamp 6, a warning lamp 8, and an air bag 7.

The air-bag control unit 1 has a central processing unit (CPU) 11, and is electrically connected to the passenger detecting device 2, the passenger-detection-state indicator lamp 6, the warning lamp 8, and the air bag 7. The control unit 1 receives a passenger-detection-state signal from the passenger detecting device 2 to judge whether the passenger is an adult, a little adult or a child. The adult corresponds to a large physical-size person of the present invention, and the little adult and the child correspond to a small physical-size person of the present invention.

The air-bag control unit 1 is also electrically connected to a not-shown crash sensor to receive a crash signal therefrom in the event of a serious accident. When it receives the crash signal, it controls the air bag 7 so that the air bug 7, adapted for a seat which is judged to have no passenger, does not deploy, while the air bag 7, adapted for a seat which is judged to have a passenger, can deploy. The air bag 7 is set to deploy so that it can have a larger volume when the judgment result of the person on the seat is an adult, or so that it can have a smaller volume when the judgment result is a child or a little adult. Note that as the judgment result, only a small physical-size passenger can be obtained and the judgment result whether he or she is the little adult or the child cannot be obtained.

The passenger detecting device 2 has a CPU 21, and is electrically connected with the air-bag control unit 1, a first weigh sensor 3a, a second weight sensor 3b, a third weight sensor 3c and a fourth weight sensor 3d, where the first to fourth weight sensors 3a to 3d are provided on a seat 4, for example the front passenger seat 4b in this embodiment, to act as a seat sensor. The passenger detecting device 2 receives a first weight signal, a second weight signal, a third weight signal and a fourth weight signal from the first to fourth weight sensors 3a to 3d, respectively, to judge a passenger on the seat 4 to be an adult or a child, and outputs the passenger-detection-state signal to the air-bag control unit 1.

The passenger-detection-state indicator lamp 6 is electrically connected to the air-bag control unit 1, and is controlled by the control unit 1 so that it can indicate no passenger, an adult, or a child based on the passenger-detection-state signal. The lamp 6 may be electrically connected to the passenger detecting device 2 instead of the air-bag control unit 1.

The warning lamp 8 is electrically connected to the air-bag control unit 1 to receive a fault signal therefrom. The warning lamp 8 lights up to warn a driver a potential malfunction when the fault signal is generated.

The air bag 7 is made of a nylon fabric with a coating on its inside and contains a not-shown pyrotechnic inflater and a not-shown igniter. The air bag 7 can deploy to absorb driver's momentum when the crash sensor detects a sufficient impact acting on the motor vehicle and the seat sensor corresponding to the air bag 7 detects the existence of the passenger. The air bag 7 can be controlled so as to deploy to have at least two different volumes according to the physical size of the passenger.

Figure 3A:
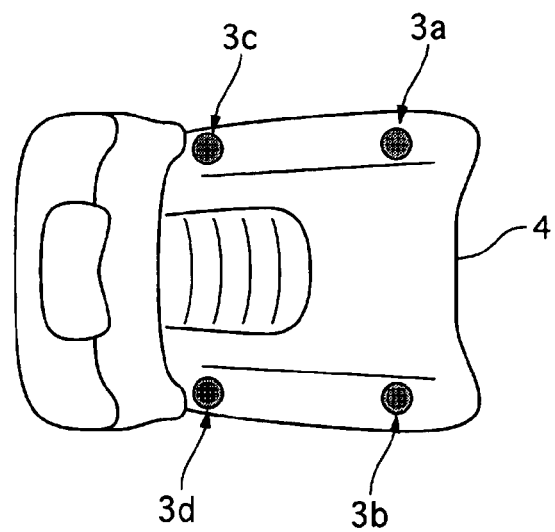
FIG. 3A is a plan view showing the seat having four weight sensors of the passenger detecting device of the first embodiment.
Figure 3B:
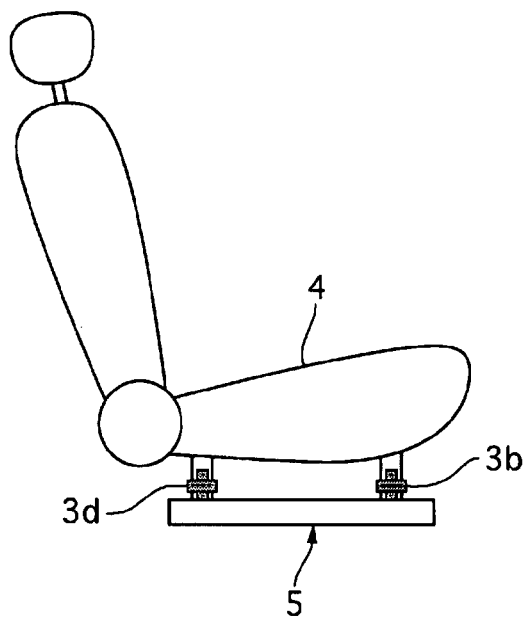
FIG. 3B is a side view showing the seat having the sensors, and the FIG. 3C is a front view showing the seat having the sensors.
Figure 3C:
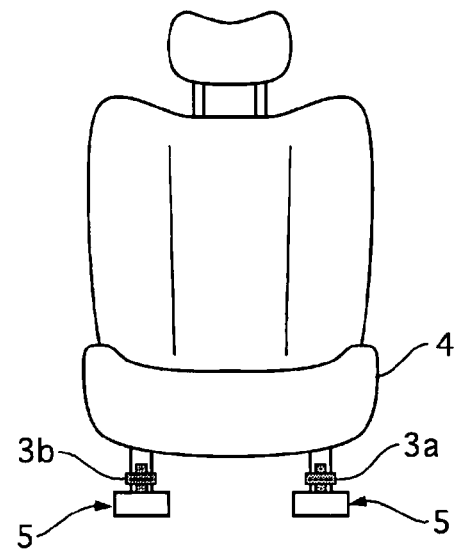

The first to fourth weight sensors 3 to 3d are arranged on four legs of the seat 4, respectively, as shown in FIGS. 3A to 3C. Specifically, the first weight sensor 3a is arranged on a front left leg of the seat 4, the second weight sensor 3b is arranged on a front right leg thereof, the third weight sensor 3d is arranged on a rear left leg thereof, and the fourth weight sensor 3d is arranged on a rear right leg thereof. The legs is slidable on two parallel seat rails 5 fixed to a vehicle body, in front and rear directions of the vehicle body.

The operation of thus-constructed air bag system including the passenger detecting device of the embodiment will be described.

When the crash sensor detects a sufficient impact and the passenger detecting device 2 detects the existence of the passenger, the air-bag control unit 1 controls the igniter to produce an ignition spark. Fuel tablets burn very rapidly to produce a given quantity of gas and deploy the air bag 7. This volume of the air bag 7 is controlled to be smaller when the passenger is judged to be a child, while it is controlled to be larger when the passenger is judged to be an adult. The air bag 7 does not deploy in case of judgment of no existence of a passenger, although the crash sensor detects the sufficient impact.

Next, the operation of the passenger detecting device 2 of the embodiment will be described.

The passenger detecting device 2 receives the first to fourth weight signals from the first to fourth weight sensors 3a to 3d, and judges whether the passenger is on the seat 4 or not, and also whether it is an adult or a child.

Figure 4:
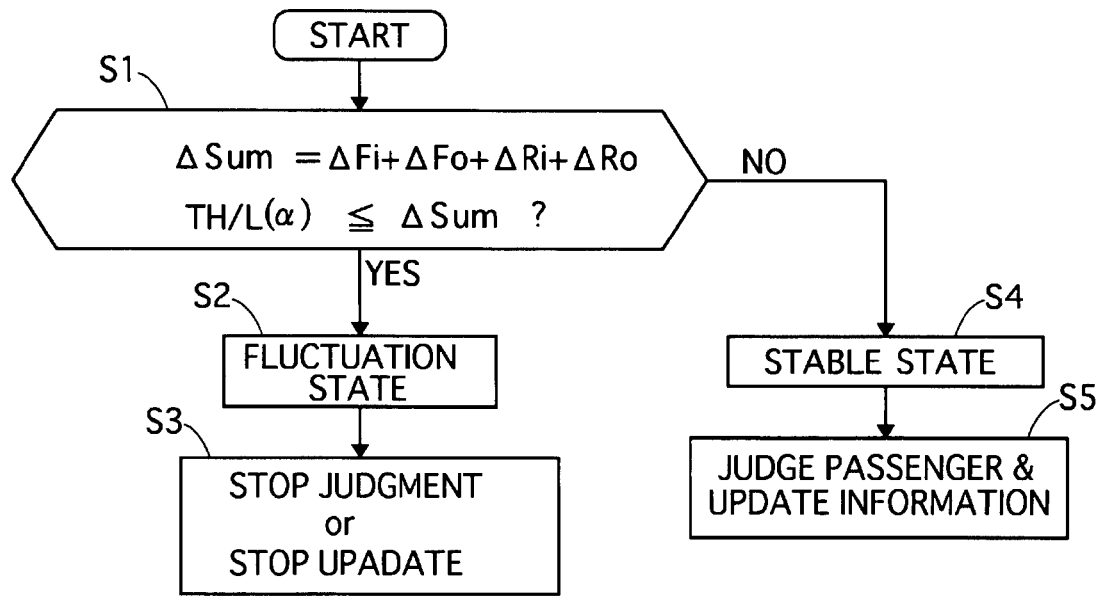
FIG. 4 is a flow chart of a weight-fluctuation monitoring process and a passenger judging and data updating process which are executed by a control unit of the passenger detecting device of the first embodiment.

FIG. 4 shows a flow chart of a weight-fluctuation monitoring process and a passenger judging and data updating process executed by the CPU 21 of the passenger detecting device 2, and their each step will be described. These processes are executed while an ignition key is kept ON.

At step S1, the passenger detecting device 2 receives the first to fourth weight signals from the first to fourth weight sensors 3a to 3d, respectively, to calculate weight fluctuation amounts $\Delta Fi$, $\Delta Fo$, $\Delta Ri$ and $\Delta Ro$ of the first to fourth weight sensors 3a to 3d and a sum-weight fluctuation amount $\Delta Sum$, where $\Delta Fi$ is the weight fluctuation amount detected by the first weight sensor 3a at front inner side of the seat 4, $\Delta Fo$ is the weight fluctuation amount detected by the second weight sensor 3b at a front outer side of the seat 4, $\Delta Ri$ is the weight fluctuation amount detected by the third weight sensor 3c at a rear left side of the seat 4, and $\Delta Ro$ is the weight fluctuation amount detected by the fourth weight sensor 3d at a rear right side of the seat 4. Incidentally, the seat 4 is the front passenger seat 4b in this embodiment, and is located at a front right side of the motor vehicle.

The weight fluctuation amounts $\Delta Fi$, $\Delta Fo$, $\Delta Ri$ and $\Delta Ro$ are absolute values and are obtained by difference values between last sampling values $Fi1$, $Fo1$, $Ri1$ and $Ro1$ and current sampling values $Fi2$, $Fo2$, $Ri2$ and $Ro2$ thereof, and the sum-weight fluctuation amount $\Delta Sum$ is obtained by summing up the first to fourth weight fluctuation amounts $\Delta Fi$, $\Delta Fo$, $\Delta Ri$ and $\Delta Ro$, and is also an absolute values. Therefore, the following formulas are obtained: $\Delta Fi = |Fi2 - Fi1|$, $\Delta Fo = |Fo2 - Fo1|$, $\Delta Ri = |Ri2 - Ri1|$, $\Delta Ro = |Ro2 - Ro1|$ and $\Delta Sum = \Delta Fi + \Delta Fo + \Delta Ri + \Delta Ro$ The examples of the amounts $\Delta Fi$, $\Delta Fo$, $\Delta Ri$, $\Delta Ro$ and $\Delta Sum$ are shown in lower parts of FIG. 6.

Then, the passenger detecting device 2 compares the sum-weight fluctuation amount $\Delta Sum$ and a first predetermined threshold value $TH/L(\alpha)$ with each other so as to judge whether the motor vehicle is in a stable state or not. The first predetermined threshold value $TH/L(\alpha)$ is a value for judging whether the motor vehicle turns, accelerates, slows down or not. If the sum-weigh fluctuation amount $\Delta Sum$ is equal to or larger than the first predetermined threshold value $TH/L(\alpha)$, the flow goes to step S2, while, if the sum-weight fluctuation amount $\Delta Sum$ is smaller than the first predetermined threshold value $TH/L(\alpha)$, the flow goes to step S4.

At the step S2, the passenger detecting device 2 judges the motor vehicle to be in a fluctuant state, and then the flow goes to step S3.

At the step S3, the passenger detecting device 2 is prevented from judging a passenger to be an adult or a child, and maintains stored information on the passenger, and then returns to the step S1. At this step S3, in stead of this prohibition of judgment, the passenger detecting device 2 may be prohibited from updating the information on the passenger although it is allowed to judge the passenger. Incidentally, the CPU 21 of the passenger detecting device 2 and its not-shown program of the step S3 correspond to an update forbidding means of the present invention.

At the step S4, the passenger detecting device 2 judges the motor vehicle to be in a stable state, and then the flow goes to step S5.

At the step S5, the passenger detecting device 2 judges the passenger to be an adult or a child and update the information on the driver, and then the flow returns to the step S1.

Incidentally, the CPU 21 of the passenger detecting device 2 and its not-shown programs of the steps S1, S2, S4 and S5 correspond to a passenger judging and data updating means of the present invention.

Figure 5A:
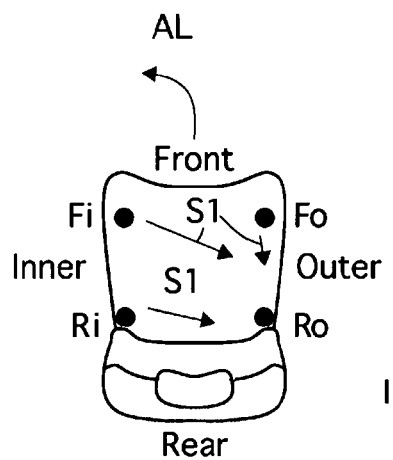
FIG. 5A is a plan view showing the seat in a state in which load shifts are generated toward an outer side of the seat when the motor vehicle turns in a counterclockwise direction.

The weight-fluctuation monitoring process and the passenger judging and data updating process will be explained, using examples of various motor vehicle states, with reference to the accompanying drawings of FIG. 5 and FIG. 6. FIG. 5 illustrates changes of load acting on the seat 4 according to various vehicle movements, and FIG. 6 illustrates a time chart of outputs Fi, Fo, Ri and Ro of the weight sensors 3a to 3d when the motor vehicle runs in the fluctuation state, then in the stable state, also illustrating examples of the weight fluctuation amounts $\Delta Fi$, $\Delta Fo$, $\Delta Ri$ and $\Delta Ro$ and the sum-weight fluctuation amount $\Delta Sum$.

First, the judging process, executed when the motor vehicle parks or runs on a flat road at a substantially constant speed, will be described. This running state is shown in a right end portion of FIG. 6.

The output values of the first to fourth weight sensors 3a to 3d are stable to provide well-rounded small fluctuation amounts, and accordingly the sum-weight fluctuation amount $\Delta Sum$ becomes to be smaller than the first predetermined threshold value $TH/L(\alpha)$. Therefore, by comparing the sum-weight fluctuation amount $\Delta Sum$ to the first predetermined threshold value $TH/L(\alpha)$ at the step S1, the motor vehicle is judged to be in the stable state at the step 4, and then the judgment of passenger is carried out and the information on the passenger is updated at the step S5, so that the air bag 7 can be deployed properly according to the detected physical size of the passenger.

Next, the judging process, executed when the motor vehicle runs on a curved road, will be described with reference to FIG. 5A and FIG. 6.

When the motor vehicle turns, centrifugal force acts on the passenger so that loads acting on the seat 4 from the passenger change. For example, as shown in FIG. 5A, when the motor vehicle turns toward a counterclockwise direction as indicated by an arrow AL, load shifts are generated as indicated by two arrows S1, so that the loads at a right side (an outer side) of the seat 4 increase while the loads at a left side (an inner side) thereof decrease. In other words, the output values of the first to fourth sensors 3a to 3d largely change to disrupt a balance of the left side weights and the right side weights: the weight fluctuation amounts $\Delta Fi$, $\Delta Fo$, $\Delta Ri$ and $\Delta Ro$ become larger, and accordingly the sum-weight fluctuation amount $\Delta Sum$ becomes equal to or larger than the first predetermined threshold value $TH/L(\alpha)$. The motor vehicle is judged to be in the fluctuation state at the step S2, and accordingly, at the step S3, the judgment of passenger is not carried out and the information on the passenger is not updated, the last one being maintained. This ensures high reliability of the judgment results of the passenger.

Next, the judging process, executed when the motor vehicle is suddenly accelerated or slowed down, will be described with reference to FIGS. 5B and 5C and 7.

Figure 5B:
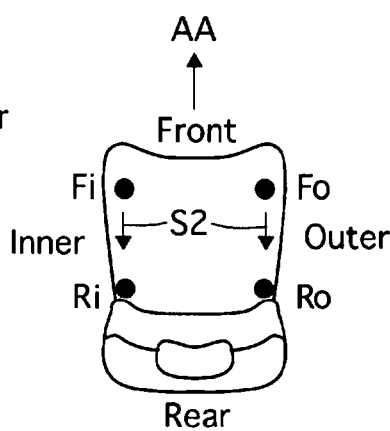
FIG. 5B is a plan view showing the seat in a state in which load shifts are generated toward a rear side of the seat when the motor vehicle is suddenly accelerated.
Figure 6:
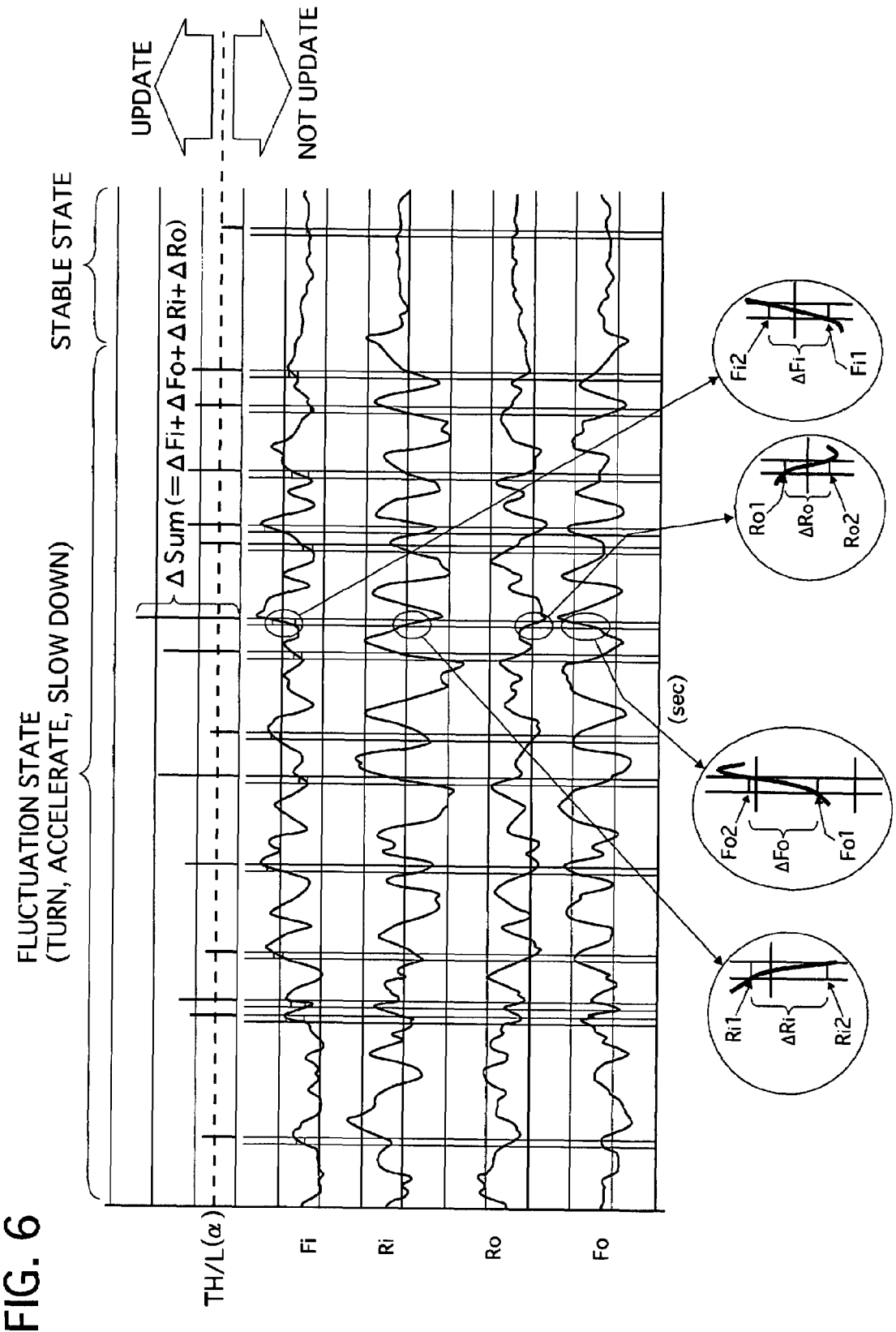
FIG. 6 is a time chart of outputs of the weight sensors and a sum-weight fluctuation amount obtained by summing up absolute values of fluctuations of the outputs of the weight sensors, in the first embodiment, when the motor vehicle runs in a fluctuation state and in a stable state.

When the motor vehicle is suddenly accelerated to increase its speed as indicated by an arrow AA in FIG. 5B, inertia force acts on the passenger in a rearward direction, the load shifts are generated as indicated by two arrows S2 in the rearward direction, so that loads at a frond side of the seat 4 decrease while the loads at the rear side thereof increase. In other words, the output values of the first to fourth sensors 3a to 3d largely change to disrupt a balance of the front side weights and the rear side weights: the weight fluctuation amounts $\Delta$Fi, $\Delta$Fo, $\Delta$Ri and $\Delta$Ro become larger, and accordingly the sum-weight fluctuation amount $\Delta$Sum becomes equal to or larger than the first predetermined threshold value TH/L($\alpha$). The motor vehicle is judged to be in the fluctuation state at the step S2, and accordingly, at the step S3, the judgment of passenger is not carried out and the information on the passenger is not updated, the last one being maintained. This ensures high reliability of the judgment results of the passenger.

Figure 5C:
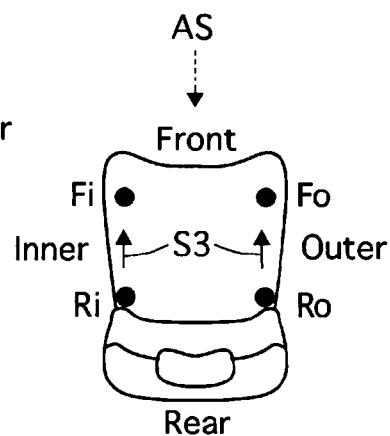
FIG. 5C is a plan view showing the seat in which load shifts are generated toward a front side of the seat when the motor vehicle is suddenly slowed down.

When the motor vehicle is suddenly slowed down to reduce its speed as indicated by an arrow AS in FIG. 5C, inertia force acts on the passenger in a forward direction, the load shifts are generated as indicated by two arrows S3 in the forward direction, so that loads at a frond side of the seat 4 increase while the loads at the rear side thereof decrease. In other words, the output values of the first to fourth sensors 3a to 3d largely change to disrupt a balance of the front side weights and the rear side weights: the weight fluctuation amounts $\Delta$Fi, $\Delta$Fo, $\Delta$Ri and $\Delta$Ro become larger, and accordingly the sum-weight fluctuation amount $\Delta$Sum becomes equal to or larger than the first predetermined threshold value TH/L($\alpha$). The motor vehicle is judged to be in the fluctuation state at the step S2, and accordingly, at the step S3, the judgment of passenger is not carried out and the information on the passenger is not updated, the last one being maintained. This ensures high reliability of the judgment results of the passenger.

Next, the judging process, executed when passengers change from one to another on the seat 4, will be described.

In this case, the one passenger leaves the seat 4, and then the other passenger sits on the seat 4. This causes the weights detected by the first to fourth weight sensors 3a to 3d to be changed, and then to be stable. In other words, in this case, the sum-weight fluctuation amount $\Delta$Sum becomes to be equal to or larger than the first predetermined threshold value TH/L($\alpha$) and then becomes to be smaller than that. After this stable state, the judgment of passenger is carried out and the information on the passenger is updated at the step S3.

Next, the judging process, executed when a child having his or her heavy luggage sits on the seat 4, will be described with reference to FIGS. 10A to 10C. In this case, the seat 4 is at least one of the driver seat 4a, the front passenger seat 4b and the rear seat 4c when the passenger is a small adult, while it is the front passenger seat 4b or the rear seat 4c when the passenger is a child.

This case is that the child gets in the motor vehicle and sits on the seat 4 with the heavy luggage, and then the first to fourth weight sensors 3a to 3d detect weights of the child and the luggage. In this case, a passenger on the seat 4 is judged to be an adult, so that the volume of the air bag 7 when it deploys is for an adult size. This is acceptable because of increase in volume of the child and the luggage.

On the other hand, after the passenger detecting device 2 judges the passenger to be an adult, the luggage may be moved off from the seat 4. In this case, the weight acting on the seat 4 largely decreases, and accordingly the sum-weight fluctuation amount $\Delta$Sum becomes to be equal to or larger than the first predetermined threshold value TH/L($\alpha$). In this state, the motor vehicle is judged to be in the fluctuation state, so that the judgment of passenger is not carried out. In a short time after the luggage is moved off, the loads acting on the seat 4 become stable, and the weight fluctuation amounts $\Delta$Fi, $\Delta$Fo, $\Delta$Ri and $\Delta$Ro become smaller. Therefore, the sum-weight fluctuation amount $\Delta$Sum becomes to be smaller than the first predetermined threshold value TH/L($\alpha$), so that the passenger on the seat 4 is judged to be a child and the information on the passenger is updated. This allows the air bag 7 to be deployed for a child size, as soon as the child moves off the heavy luggage from his or her seat 4.

The advantages of the passenger detecting device of the first embodiment will be described.

The passenger detecting device of the first embodiment is constructed so as to judge whether a passenger on the seat 4 is an adult or a child when the sum-weight fluctuation amount $\Delta$Sum becomes to be smaller than the first predetermined threshold value TH/L($\alpha$), so that the judgment of passenger is not carried when the motor vehicle is in the fluctuation state. Therefore, it can improve reliability in the judgment of passenger.

Next, a passenger detecting device of a second embodiment according to the present invention will be described.

The passenger detecting device of the second embodiment has a construction shown in FIG. 2, similarly to that of the first embodiment, and its weight-fluctuation monitoring process executed therein is different from that of the first embodiment and a sensor-malfunction process is added.

This weight-fluctuation monitoring process is carried out by a CPU 21 of the passenger detecting device 2 according to a flow chart shown in FIG. 7, and its each step thereof will be described.

At step S11, the passenger detecting device 2 receives first to fourth weight signals from first to fourth weight sensors 3a to 3d, respectively, to calculate weight fluctuation amounts $\Delta$Fi, $\Delta$Fo, $\Delta$Ri and $\Delta$Ro of the first to fourth weight sensors 3a to 3d and a sum-weight fluctuation amount $\Delta$Sum obtained by summing up absolute values of the weight fluctuation amounts $\Delta$Fi, $\Delta$Fo, $\Delta$Ri and $\Delta$Ro. Then, it judges whether the sum-weight fluctuation amount $\Delta$Sum is equal to or larger than a first predetermined threshold value TH/L($\alpha$). If the judgment result is YES, the flow goes to step S12, while if it is NO, the flow goes to step S14.

At the step S12, a motor vehicle is judged to be in a fluctuation state, and then the flow goes to step S13.

At the step S13, the sensor-malfunction detecting process starts. This process will be later described.

At the step S14, the motor vehicle is judged in a stable state, and then the flow goes to step S15.

At the step S15, the sensor-malfunction detecting process is not carried out or is stopped when it has started.

Figure 7:
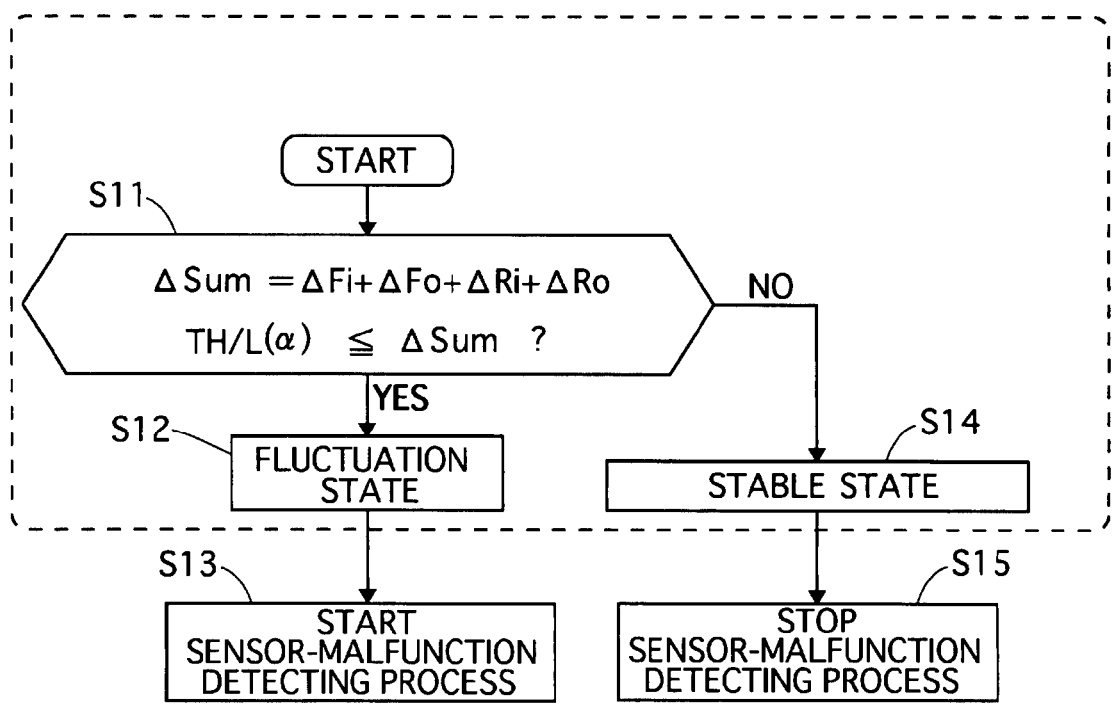
FIG. 7 is a flow chart of a weight-fluctuation monitoring process and a passenger judging and data updating process which are executed by a control unit of a passenger detecting device of a second embodiment according to the present invention.

Incidentally, the steps enclosed by a chained line in FIG. 7 belong to a passenger detecting process.

Figure 8:
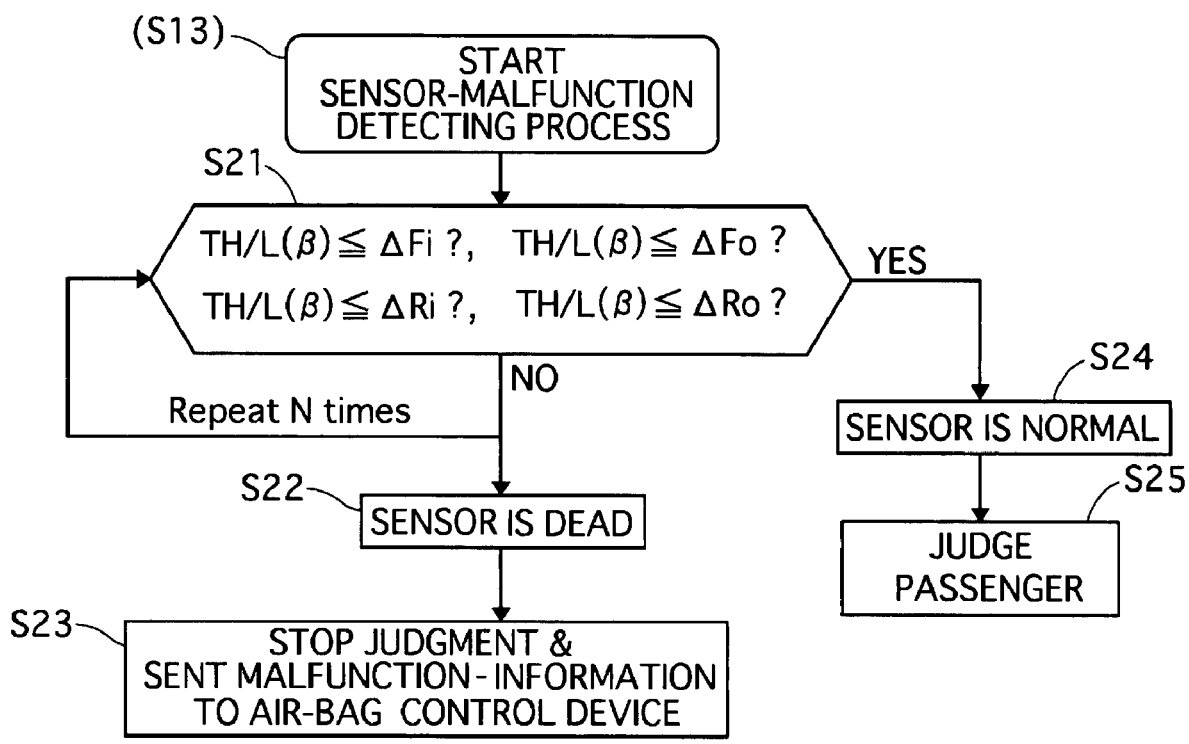
FIG. 8 is a flow chart of a sensor-malfunction detecting process which is executed by the control unit of the passenger detecting unit.

The sensor-malfunction detecting process executed by the CPU 21 of the passenger detecting device will be described. In the process, a flow chart, of the sensor-malfunction detecting process, shown in FIG. 8 is carried out.

At step S21, the passenger detecting device 2 judges whether each of the weight fluctuation amounts $\Delta$Fi, $\Delta$Fo, $\Delta$Ri and $\Delta$Ro is equal to or smaller than a second predetermined threshold value TH/L($\beta$). The second predetermined threshold value TH/L($\beta$) is set to be a small one so that the passenger detecting device 2 can judge the weight sensors 3a to 3d to be in a no-output state. This judgment is repeated N times. When at least one of the weight fluctuation amounts $\Delta$Fi, $\Delta$Fo, $\Delta$Ri and $\Delta$Ro is equal to or smaller than the second predetermined threshold value TH/L($\beta$), the flow goes to step S22, while if all of them are larger than that, the flow goes to step S24.

At the step S22, sensor malfunction is judged, and then the flow goes to step S23.

At the step S23, judgment of a passenger is stopped, and information on the sensor malfunction is sent to an air-bag control device 1.

At the step S24, the sensors 3a to 3d are judged to be in a normal state, and then the flow goes to step S25.

At the step S25, the judgment of the passenger is carried out based on the outputs Fi, Fo, Ri and Ro of the weight sensors 3a to 3d.

Figure 9:
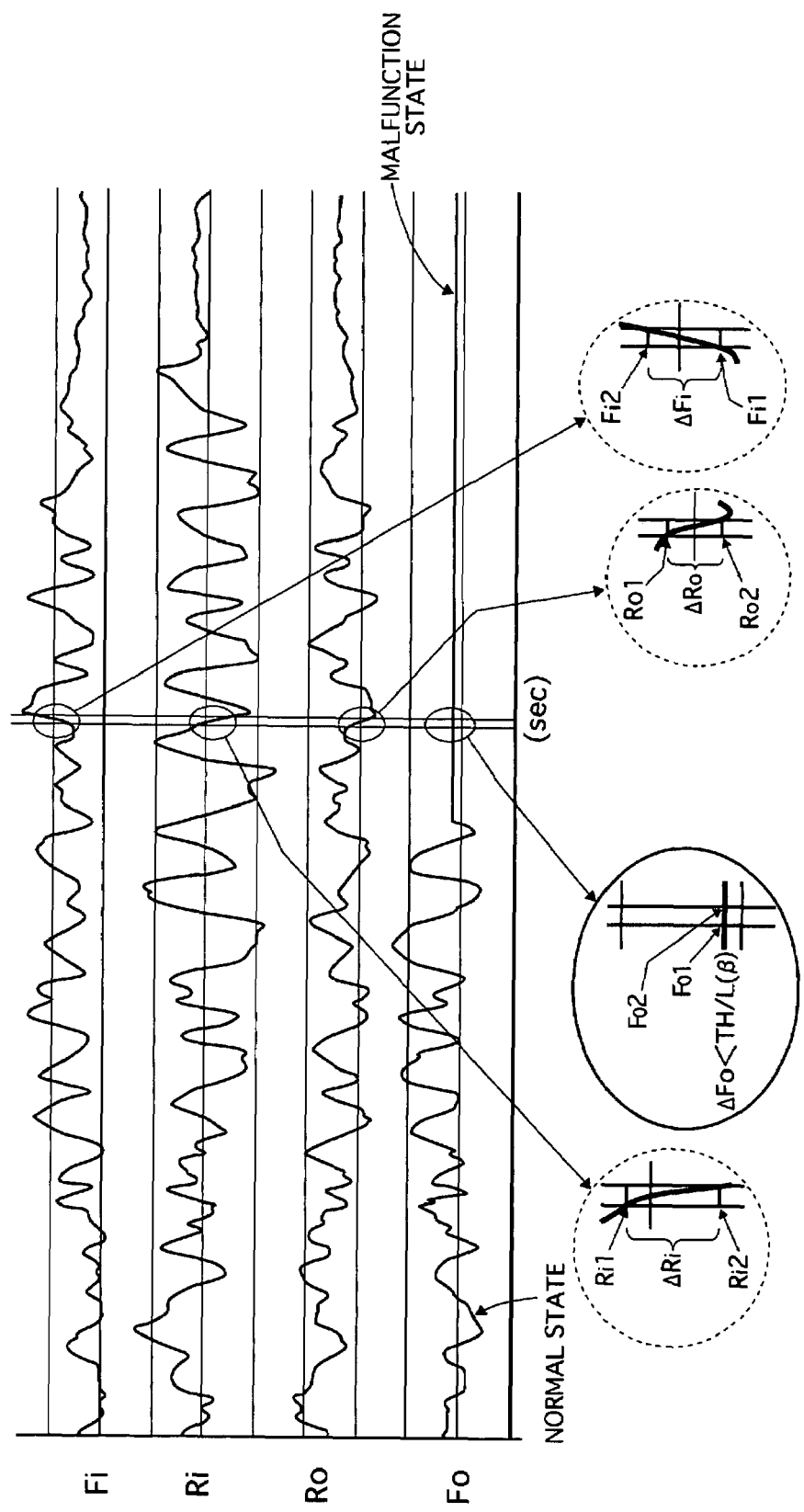
FIG. 9 is a time chart of outputs of weight sensors and a sum-weight fluctuation amount obtained by summing up absolute values of fluctuations of the outputs of the weight sensors, in the second embodiment, when a motor vehicle runs in a fluctuation state and in a stable state.

An example in a sensor-malfunction case is shown in FIG. 9 as a time chart, where the second weight sensor 3b fails on the way as shown in a lower part in FIG. 9.

In the passenger detecting device 2 of the second embodiment, the sensor-malfunction detecting process is carried out while the motor vehicle is in the fluctuation state. The sensor 3a to 3d is judged to be in a malfunction state when the weight fluctuation amount ΔFi, ΔFo, ΔRi, ΔRo thereof does not change substantially, namely when it is smaller than the second predetermined threshold value TH/L(β).

When the motor vehicle is in the fluctuation state, all of the weight fluctuation amounts ΔFi, ΔFo, ΔRi and ΔRo largely vary if the weight sensors 3a to 3d are in the normal state. Accordingly, it is easy to detect which of the weight sensors is in the malfunction state, because the weight fluctuation amount of the weight sensor in the malfunction state is different from those of the weight sensors in the normal state when the motor vehicle is in the fluctuation state.

Incidentally, the CPU 21 and a program executing the sensor-malfunction detecting process correspond to a sensor-malfunction detecting means of the present invention.

The passenger detecting device 2 of the second embodiment has the following advantages in addition to the advantage of the first embodiment.

The passenger detecting device 2 of the second embodiment judges the sensor malfunction based on the weight fluctuation amounts ΔFi, ΔFo, ΔRi, ΔRo of the weight sensors 3a to 3d, by comparing them to the second predetermined threshold value TH/L(β) when the motor vehicle is in the fluctuation state. This enables the passenger detecting device 2 to detect the malfunction of the weight sensors 3a to 3d even when its output is fixed in regular voltage or in irregular voltage. Therefore, reliability of the judgment of the passenger can be improved.

While there have been particularly shown and described with reference to preferred embodiments thereof, it will be understood that various modifications may be made therein, and it is intended to cover in the appended claims all such modifications as fall within the true spirit and scope of the invention.

The first to fourth weight sensors 3a to 3d may employ a strain gauge transducer, a hydraulic type weight sensor, or others which can directly or indirectly detectable the weight, as long as it can accurately detect the weight of a passenger on a seat.

In the embodiments, the four weight sensors 3a to 3d are used, while the number of the weight sensors may be changed.

The weight sensors 3a to 3d may be provided on another seat or on other seats.

The passenger detecting device of the invention may be applied to a system different from air-bag systems or a device different from air-bags or the like.

The entire contents of Japanese Patent Application No. 2006-193080 filed Jul. 13, 2006 are incorporated herein by reference.

What is claimed is:

1. A passenger detecting device adapted for motor vehicle, the passenger detecting device comprising:
   a plurality of weight sensors that are arranged at different positions of a seat for respectively detecting loads acting on the seat;
   a passenger judging and data updating means that is capable of judging a passenger on the seat based on the loads detected by the weight sensors and updating information on the passenger; and
   an update forbidding means that prevents the passenger judging and data updating means from judging the passenger when a sum-weight fluctuation amount is not less than a first predetermined threshold value, where the sum-weight fluctuation amount is obtained by summing up weight function amounts which are absolute values of fluctuations of the loads detected by the weight sensors.

2. The passenger detecting device according to claim 1, further comprising:
   a sensor-malfunction means judges sensor malfunction by comparing the weight fluctuation amounts to a second predetermined threshold value when the sum-weight fluctuation amount is not less than the first predetermined threshold value.

3. The passenger detecting device according to claim 2, wherein
   the weight sensors are located at a front left position, a front right position, a rear left position and a rear right position of the seat, respectively.

4. The passenger detecting device according to claim 3, wherein
   the weight sensors are located on legs of the seat.

5. The passenger detecting device according to claim 2, further comprising:
   an air bag that is capable of deploying to have different volumes according to the information of the passenger judging and data updating means.

6. The passenger detecting device according to claim 1, further comprising:
   an air bag that is capable of deploying to have different volumes according to the information of the passenger judging and data updating means.

7. A passenger detecting device adapted for motor vehicle, the passenger detecting device comprising:
   a plurality of weight sensors that are arranged at different positions of a seat for respectively detecting loads acting on the seat;
   a passenger judging and data updating means that is capable of judging a passenger on the seat based on the loads detected by the weight sensors and updating information on the passenger; and
   an update forbidding means that prevents the information from being updated when a sum-weight fluctuation amount is not less than a first predetermined threshold value, where the sum-weight fluctuation amount is obtained by summing up weight function amounts which are absolute values of fluctuations of the loads detected by the weight sensors.

8. The passenger detecting device according to claim 7, further comprising:
   a sensor-malfunction means judges sensor malfunction by comparing the weight fluctuation amounts to a second predetermined threshold value when the sum-weight fluctuation amount is not less than the first predetermined threshold value.

9. The passenger detecting device according to claim 8, wherein
   the weight sensors are located at a front left position, a front right position, a rear left position and a rear right position of the seat, respectively.

10. The passenger detecting device according to claim 9, wherein
    the weight sensors are located on legs of the seat.

11. The passenger detecting device according to claim 8, further comprising:

an air bag that is capable of deploying to have different volumes according to the information of the passenger judging and data updating means.

12. The passenger detecting device according to claim 7, further comprising:

an air bag that is capable of deploying to have different volumes according to the information of the passenger judging and data updating means.

* * * * *